US009999114B2

(12) United States Patent
Takenouchi et al.

(10) Patent No.: US 9,999,114 B2
(45) Date of Patent: Jun. 12, 2018

(54) CONTROL SYSTEM AND SENSOR UNIT

(71) Applicant: Panasonic Intellectual Property Management Co., Ltd., Osaka (JP)

(72) Inventors: Toshiharu Takenouchi, Osaka (JP); Yusuke Hashimoto, Osaka (JP); Hiroshi Matsuda, Osaka (JP); Yasuhiro Mori, Mie (JP); Koichiro Kui, Mie (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days. days.

(21) Appl. No.: 15/504,247

(22) PCT Filed: Jul. 13, 2015

(86) PCT No.: PCT/JP2015/003521
§ 371 (c)(1),
(2) Date: Feb. 15, 2017

(87) PCT Pub. No.: WO2016/027406
PCT Pub. Date: Feb. 25, 2016

(65) Prior Publication Data
US 2017/0265276 A1    Sep. 14, 2017

(30) Foreign Application Priority Data
Aug. 18, 2014    (JP) ................................. 2014-165710

(51) Int. Cl.
*H05B 37/02* (2006.01)
*H05B 37/03* (2006.01)

(52) U.S. Cl.
CPC ......... *H05B 37/0227* (2013.01); *H05B 37/03* (2013.01)

(58) Field of Classification Search
CPC ................ H05B 37/02; H05B 37/0227; H05B 37/0281; G08B 21/22; G01S 13/56;
(Continued)

(56) References Cited

U.S. PATENT DOCUMENTS 8,934,784 B2 * 1/2015 Guo ..................... H04B 10/116
                                                            398/172
9,414,464 B2 * 8/2016 Hidaka ............. H05B 37/0227
(Continued)

FOREIGN PATENT DOCUMENTS

JP    H08-153292 A    6/1996
JP    2002-208493 A   7/2002
(Continued)

OTHER PUBLICATIONS

International Search Report issued in Application No. PCT/JP2015/003521 dated Sep. 8, 2015, with English translation.

*Primary Examiner* — Haissa Philogene
(74) *Attorney, Agent, or Firm* — McDermott Will & Emery LLP

(57) ABSTRACT

A control system includes: a first human detector that detects the presence or absence of a human within a first detection range; a second human detector that has a second detection range that overlaps with the first detection range, and detects the presence or absence of a human within the second detection range; a determiner that has a plurality of determination modes for determining the presence or absence of a human; a transmitter that transmits a control signal to a control target based on a result of determination made by the determiner; and a load that receives the control signal and serves as the control target whose operation mode is switched according to the control signal. The determiner performs operation in a first determination mode for determining the presence or absence of a human based on at least a result of detection performed by the first human detector (Continued)

when the load is in a first operation mode, and performs operation in a second determination mode for determining the presence or absence of a human based on a result of detection performed by the second human detector when the load is in a second operation mode that is different from the first operation mode.

10 Claims, 9 Drawing Sheets

(58) Field of Classification Search
CPC .. G01S 15/523; G01S 17/026; F21V 23/0471; Y02B 20/44; G06K 9/00369; G06K 9/00228; H04N 5/23219; H04N 5/23222
See application file for complete search history.

(56) References Cited

U.S. PATENT DOCUMENTS

| | | | |
|---|---|---|---|
| 9,691,255 B2 * | 6/2017 | Matsui | G08B 21/22 |
| 2015/0123547 A1 * | 5/2015 | Fushimi | A47F 3/001 |
| | | | 315/155 |

FOREIGN PATENT DOCUMENTS

| | | |
|---|---|---|
| JP | 2002-246189 A | 8/2002 |
| JP | 2004-259565 A | 9/2004 |
| JP | 2006-333144 A | 12/2006 |
| JP | 2009-146176 A | 7/2009 |
| JP | 2010-226678 A | 10/2010 |
| JP | 2013-096947 A | 5/2013 |

\* cited by examiner

CONTROL SYSTEM AND SENSOR UNIT

RELATED APPLICATIONS

This application is the U.S. National Phase under 35 U.S.C. § 371 of International Application No. PCT/JP2015/003521, filed on Jul. 13, 2015, which in turn claims the benefit of Japanese Application No. 2014-165710, filed on Aug. 18, 2014, the disclosures of which applications are incorporated by reference herein.

TECHNICAL FIELD

The present invention relates to a control system and a sensor unit.

BACKGROUND ART

A human body detection system is conventionally known that includes a sensor camera and a sensor apparatus, and that performs human body detection by using the sensor apparatus when a monitoring region is dark and performs human body detection by using the sensor camera when the monitoring region is sufficiently bright and in an environment in which the difference between atmospheric temperature and body temperature is small (see, for example, Patent Literature (PTL) 1).

CITATION LIST

Patent Literature

PTL 1: Japanese Unexamined Patent Application Publication No. 2009-146176

SUMMARY OF THE INVENTION

Technical Problem

However, the human body detection system disclosed in PTL 1 performs switching between the sensor camera and the sensor apparatus based on the surrounding environment of the sensor's monitoring region, and it is therefore necessary to provide, for example, a sensor that detects ambient brightness in order to detect the surrounding environment. In the case where a sensor that detects ambient brightness is not provided, in order to switch the detector, the user has to manually provide an input at his/her own discretion.

The present invention has been made in view of the problem as described above, and it is an object of the present invention to provide a control system and a sensor unit with which the presence or absence of a human can be automatically determined in a determination mode that is appropriate for a load, without having to provide a sensor for detecting the surrounding environment in addition to the sensor unit.

Solutions to Problem

A control system according to one aspect of the present invention includes: a first human detector that detects presence or absence of a human within a first detection range without causing a reduction in sensitivity even in a dark environment; a second human detector that has a second detection range that overlaps with the first detection range, the second human detector including an image capturer that captures an image in the second detection range and detecting presence or absence of a human within the second detection range based on the image captured by the image capturer; a determiner that has a plurality of determination modes for determining presence or absence of a human; a transmitter that transmits a control signal to a control target based on a result of determination made by the determiner; and a load that receives the control signal and serves as the control target whose operation mode is switched according to the control signal, and when the load is in a first operation mode, the determiner performs operation in a first determination mode for determining the presence or absence of a human based on at least a result of detection performed by the first human detector, and when the load is in a second operation mode that is different from the first operation mode, the determiner performs operation in a second determination mode for determining the presence or absence of a human based on a result of detection performed by the second human detector.

A sensor unit according to one aspect of the present invention includes: a first human detector that detects presence or absence of a human within a first detection range without causing a reduction in sensitivity even in a dark environment; a second human detector that has a second detection range that overlaps with the first detection range, the second human detector including an image capturer that captures an image in the second detection range and detecting presence or absence of a human within the second detection range based on the image captured by the image capturer; a determiner that has a plurality of determination modes for determining presence or absence of a human; and a transmitter that transmits, to a load, a control signal instructing the load to switch an operation mode of the load based on a result of determination made by the determiner, and when the load is in a first operation mode, the determiner performs operation in a first determination mode for determining the presence or absence of a human based on at least a result of detection performed by the first human detector, and when the load is in a second operation mode that is different from the first operation mode, the determiner performs operation in a second determination mode for determining the presence or absence of a human based on a result of detection performed by the second human detector.

Advantageous Effect of Invention

With the control system and the sensor unit according to one aspect of the present invention, the presence or absence of a human can be automatically determined in a determination mode that is appropriate for a load, without having to provide a sensor for detecting the surrounding environment in addition to the sensor unit by switching the determination mode to an optimal determination mode according to the operation mode of the load serving as a control target.

DESCRIPTION OF EXEMPLARY EMBODIMENTS

Hereinafter, embodiments of the present invention will be described in detail with reference to the drawings. Note that the embodiments described below show preferred specific examples of the present invention. The numerical values, shapes, materials, structural elements, the arrangement and connection of the structural elements, steps, the order of the steps, and the like shown in the following embodiments are merely examples, and therefore do not limit the scope of the present invention. Also, among the structural elements described in the following embodiments, structural elements not recited in any one of the independent claims are described as arbitrary structural elements that constitute more preferred embodiments.

Embodiment 1

Hereinafter, control system 100 according to Embodiment 1 will be described with reference to FIGS. 1 to 3.

Figure 1:
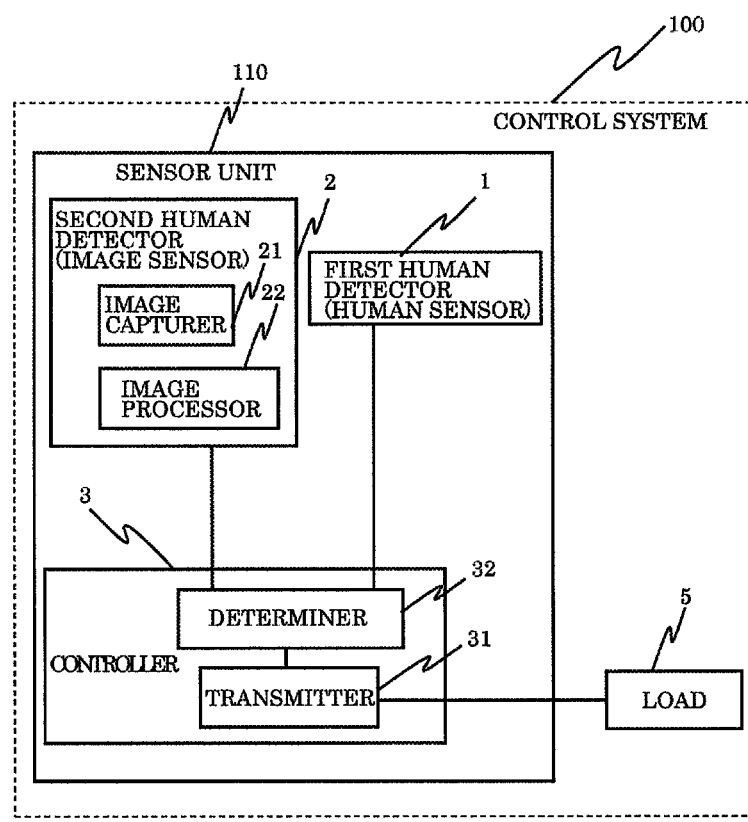
FIG. 1 is a block diagram of a control system according to Embodiment 1.

FIG. 1 is a block diagram of control system 100. As shown in FIG. 1, control system 100 includes sensor unit 110 and load 5. Sensor unit 110 includes human sensor 1, image sensor 2 and controller 3. Control system 100 includes: at least one human sensor 1 that serves as a first human detector and detects the presence or absence of a human within a first detection range without causing a reduction in sensitivity even in a dark environment such as, for example, nighttime; image sensor 2 that serves as a second human detector and has a second detection range that overlaps with the first detection range, image sensor 2 including image capturer 21 that captures an image in the second detection range and image processor 22 that detects the presence or absence of a human based on the image captured by image capturer 21; controller 3 including determiner 32 that has a plurality of determination modes in which the presence or absence of a human is determined and transmitter 31 that transmits a control signal to a control target based on the result of determination made by determiner 32; and load 5 that receives the control signal and serves as the control target whose operation mode is switched according to the control signal.

Load 5 has at least two operation modes: an "active" mode and an "inactive" mode, and load 5 can be, but is not limited to, for example, a lighting apparatus, an air conditioner or the like. Hereinafter, for the sake of convenience of the description, the following description will be given assuming that load 5 is lighting apparatus 5, but there is no particular limitation on the type of lighting apparatus and the like. Also, lighting apparatus 5 has at least two operation modes: an "illumination" mode and an "extinguishment" mode. The operation modes of lighting apparatus 5 are not limited to the two operation modes of the "active" mode and the "inactive" mode, and the load may have three or more operation modes such as, for example, a "brightness adjustment" mode, a "color adjustment" mode and the like in the case where the load is lighting apparatus 5.

Determiner 32 has a first determination mode and a second determination mode, the first determination mode being a mode in which determiner 32 determines that there is a human within the first and second detection ranges if both human sensor 1 and image sensor 2 detect the presence of a human, and the second determination mode being a mode in which determiner 32 determines that there is a human within the second detection range if image sensor 2 detects the presence of a human. Also, determiner 32 performs switching between the first determination mode and the second determination mode according to the operation mode of lighting apparatus 5.

For example, determiner 32 determines the presence or absence of a human in the first determination mode while lighting apparatus 5 is extinguished and determines the presence or absence of a human in the second determination mode while lighting apparatus 5 is illuminated.

Transmitter 31 transits a control signal to lighting apparatus 5 based on the result of determination made by determiner 32 as to whether or not there is a human.

For example, if determiner 32 determines in the first determination mode that there is a human while lighting apparatus 5 is extinguished, transmitter 31 transmits, to lighting apparatus 5, a control signal instructing lighting apparatus 5 to illuminate. If determiner 32 determines in the second determination mode that there is no human while lighting apparatus 5 is illuminated, transmitter 31 transmits, to lighting apparatus 5, a control signal instructing lighting apparatus 5 to extinguish.

Sensor unit 110 includes, for example, four human sensors 1 and one image sensor 2, but there is no particular limitation on the number of various types of sensors, and the number of sensors may be changed as appropriate and necessary.

Figure 2:
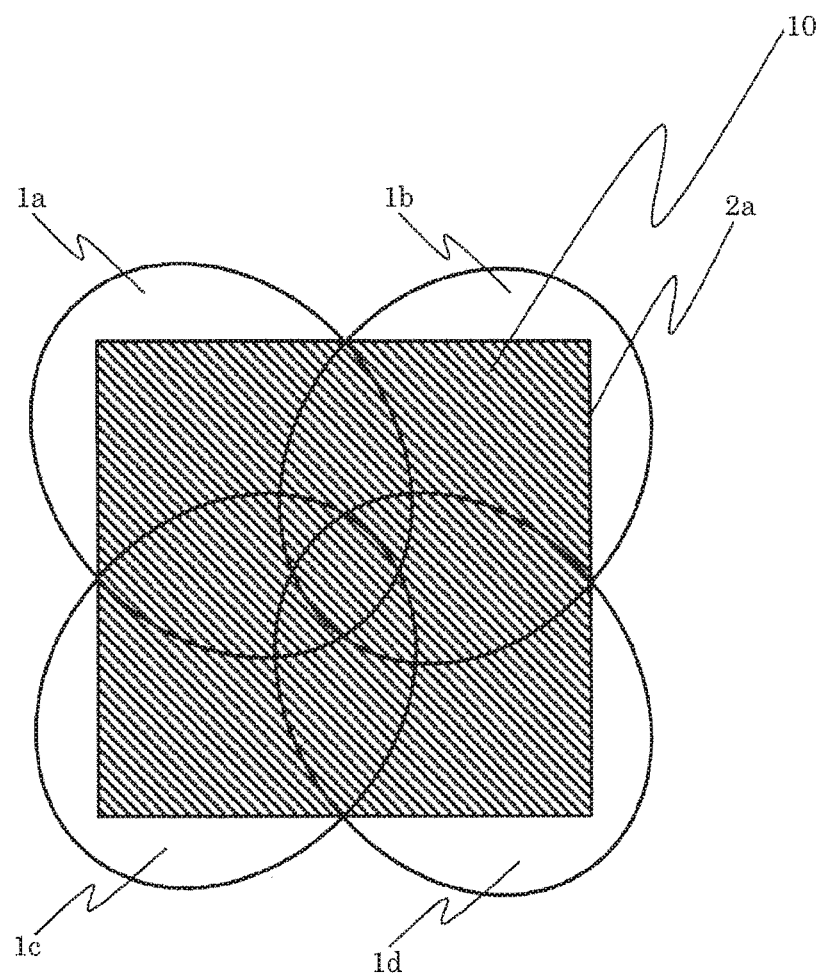
FIG. 2 is a plan view showing an example of a detection range of a sensor unit according to Embodiment 1.

FIG. 2 is a plan view showing an example of detection range 10 of sensor unit 110. As shown in FIG. 2, the first human detector has the following human sensor detection ranges: detection ranges 1a, 1b, 1c and 1d. The first detection range is composed of detection ranges 1a, 1b, 1c and 1d. The second detection range of the second human detector (namely, image sensor 2) is detection range 2a. Detection range 2a of image sensor 2 overlaps with human sensor detection ranges 1a, 1b, 1c and 1d of human sensor 1. Hereinafter, an overlapping portion (the hatched region shown in FIG. 2) between detection ranges 1a, 1b, 1c and 1d of human sensor 1 and detection range 2a of image sensor 2 will be referred to as detection range 10 of sensor unit 110.

Figure 3:
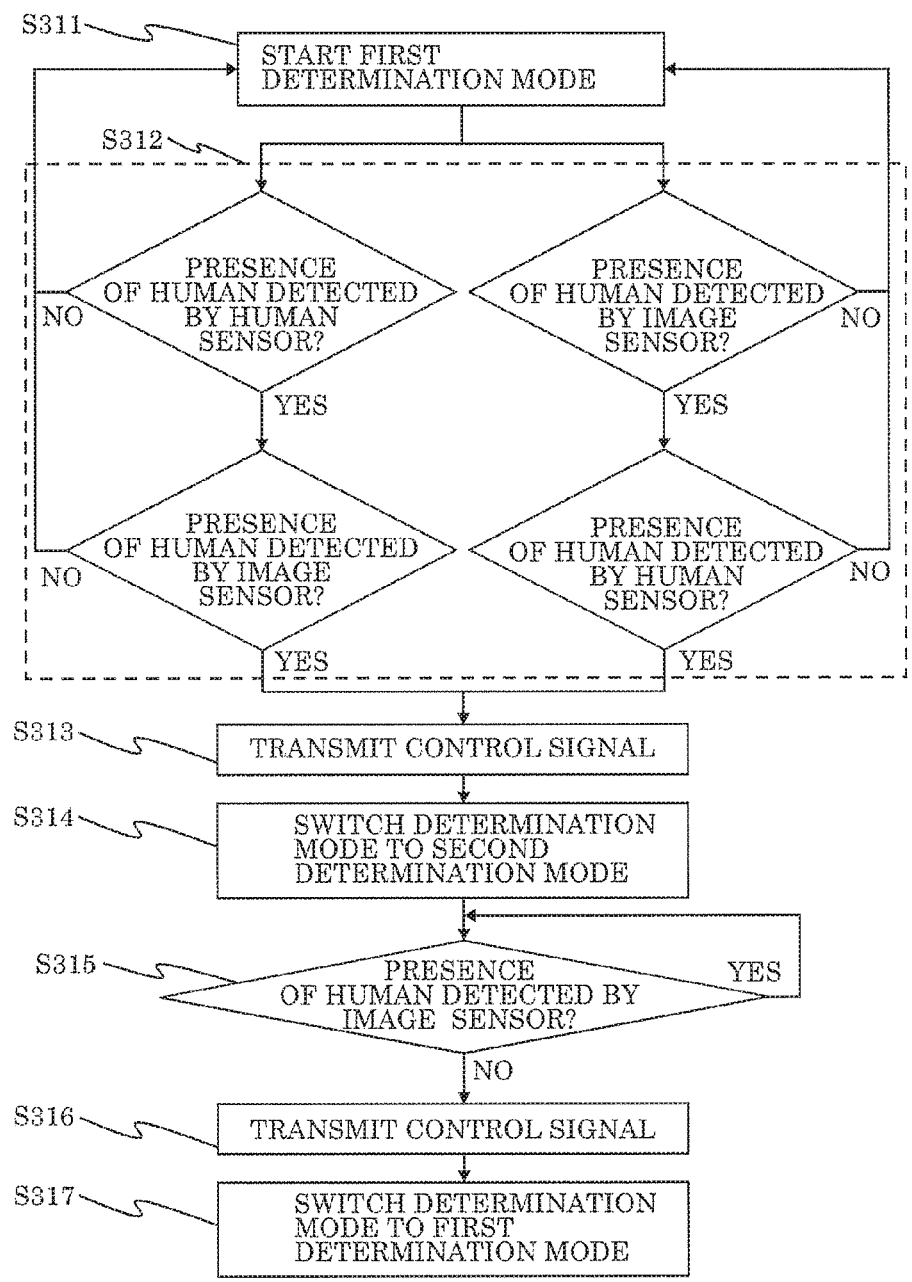
FIG. 3 is an operational flowchart of the control system according to Embodiment 1.

FIG. 3 is an operational flowchart of control system 100.

Determiner 32 of control system 100 determines the presence or absence of a human in the first determination mode while lighting apparatus 5 is extinguished (step S311).

In step S312, determiner 32 determines that there is a human within detection range 10 if both human sensor 1 and image sensor 2 detect the presence of a human. Otherwise, or in other words, if at least either one of human sensor 1 and image sensor 2 detects that there is no human, determiner 32 determines that there is no human within detection range 10. For example, as shown in FIG. 3, if human sensor 1 detects the presence of a human, and thereafter image sensor 2 also detects the presence of a human, determiner 32 determines that there is a human within detection range 10. If, on the other hand, image sensor 2 detects the presence of a human, and thereafter human sensor 1 also detects the presence of a human, determiner 32 determines that there is a human within detection range 10. Note that, in FIG. 3, for the sake of convenience of the description, the description is given assuming that either one of human sensor 1 and image sensor 2 detects the presence of a human before the other one does, but human sensor 1 and image sensor 2 may simultaneously detect the presence of a human.

If determiner 32 determines in step S312 that there is a human, the procedure proceeds to step S313. If determiner 32 determines in step S312 that there is no human, the procedure returns to step S311, where determiner 32 continues to determine the presence or absence of a human in the first determination mode.

In step S313, transmitter 31 transmits, to lighting apparatus 5, a control signal instructing lighting apparatus 5 to illuminate. Then, determiner 32 switches the determination mode from the first determination mode to the second determination mode (step S314), and the procedure proceeds to step S315.

In step S315, determiner 32 of control system 100 determines the presence or absence of a human based on the result of detection of image sensor 2. If image sensor 2 does not detect the presence of a human (NO in step S315), determiner 32 determines that there is no human within detection range 10, and the procedure proceeds to step S316. If image sensor 2 detects the presence of a human, determiner 32 determines that there is a human within detection range 10, and continues to determine the presence or absence of a human in the second determination mode (YES in step S315).

In step S316, transmitter 31 transmits, to lighting apparatus 5, a control signal instructing lighting apparatus 5 to extinguish. Then, determiner 32 switches the determination mode from the second determination mode to the first determination mode (step S317), and the operation of control system 100 returns to step S311, and the above operation is repeated.

Sensor unit 110 includes human sensor 1, image sensor 2 and controller 3 that includes: determiner 32 having a plurality of determination modes in which determiner 32 determines the presence or absence of a human; and transmitter 31 that transmits, lighting apparatus 5, a control signal instructing lighting apparatus 5 to switch the operation mode of lighting apparatus 5 based on the result of determination made by determiner 32. When the operation mode of lighting apparatus 5 is "extinguishment" mode, determiner 32 performs operation in the first determination mode for determining the presence or absence of a human based on at least the result of detection performed by human sensor 1. When the operation mode of lighting apparatus 5 is "illumination" mode, determiner 32 performs operation in the second determination mode for determining the presence or absence of a human based on the result of detection performed by image sensor 2.

Control system 100 and sensor unit 110 can automatically switch the determination mode to an optimal determination mode according to the operation mode of lighting apparatus 5 such as "illumination" mode and "extinguishment" mode. Accordingly, control system 100 and sensor unit 110 can determine the presence or absence of a human in a determination mode appropriate for lighting apparatus 5, without having to provide a sensor for detecting the surrounding environment in addition to sensor unit 110.

The present embodiment has been described assuming that the first human detector is a human sensor, but the present invention is not limited thereto. For example, the first human detector may be any sensor such as an ultrasonic sensor, as long as it does not cause a reduction in sensitivity even in a dark environment. Also, sensor unit 110 has been described to include four human sensors, but there is no limitation on the number of sensors and the type of sensors. For example, sensor unit 110 may include two human sensors and one ultrasonic sensor.

Also, for the sake of convenience of the description, transmitter 31 and determiner 32 are provided in controller 3, but the present invention is not limited thereto.

Also, the first determination mode has been described as a mode in which the presence of a human within detection range 10 is determined only if both human sensor 1 and image sensor 2 detect the presence of a human, but the present invention is not limited thereto. For example, the presence of a human within detection range 10 may be determined if human sensor 1 detects the presence of a human.

Also, control system 100 and sensor unit 110 may simultaneously perform step S313 and step S314. To be specific, transmitter 31 may transmit, to lighting apparatus 5, the control signal instructing lighting apparatus 5 to illuminate at the same time when determiner 32 switches the determination mode to the second determination mode.

Also, a configuration has been described in which, in control system 100, image processor 22 detects the presence or absence of a human, and determiner 32 determines the presence or absence of a human by using the result of detection performed by image processor 22, but the present invention is not limited thereto. For example, the functionality of image processor 22 may be integrated into determiner 32.

Also, detection range 10 of sensor unit 110 is an overlapping portion between detection ranges 1*a*, 1*b*, 1*c* and 1*d* of human sensor 1 and detection range 2*a* of image sensor 2, but it is merely a matter of design, and the present invention is not limited thereto. For example, detection range 10 of sensor unit 110 may be a union of detection ranges 1*a*, 1*b*, 1*c* and 1*d* of human sensor 1 and detection range 2*a* of image sensor 2.

Embodiment 2

Hereinafter, control system 200 and sensor unit 210 according to Embodiment 2 will be described with reference to FIGS. 4 and 5. Control system 200 and sensor unit 210 are different from control system 100 and sensor unit 110 in that controller 3 further includes storage 33 that stores therein predetermined period T and that transmitter 31 transmits a control signal to lighting apparatus 5 if determiner 32 continuously determines that there is no human over predetermined period T. The structural elements that are the same as those of Embodiment 1 are given the same reference numerals, and a description thereof is omitted as appropriate.

Figure 4:
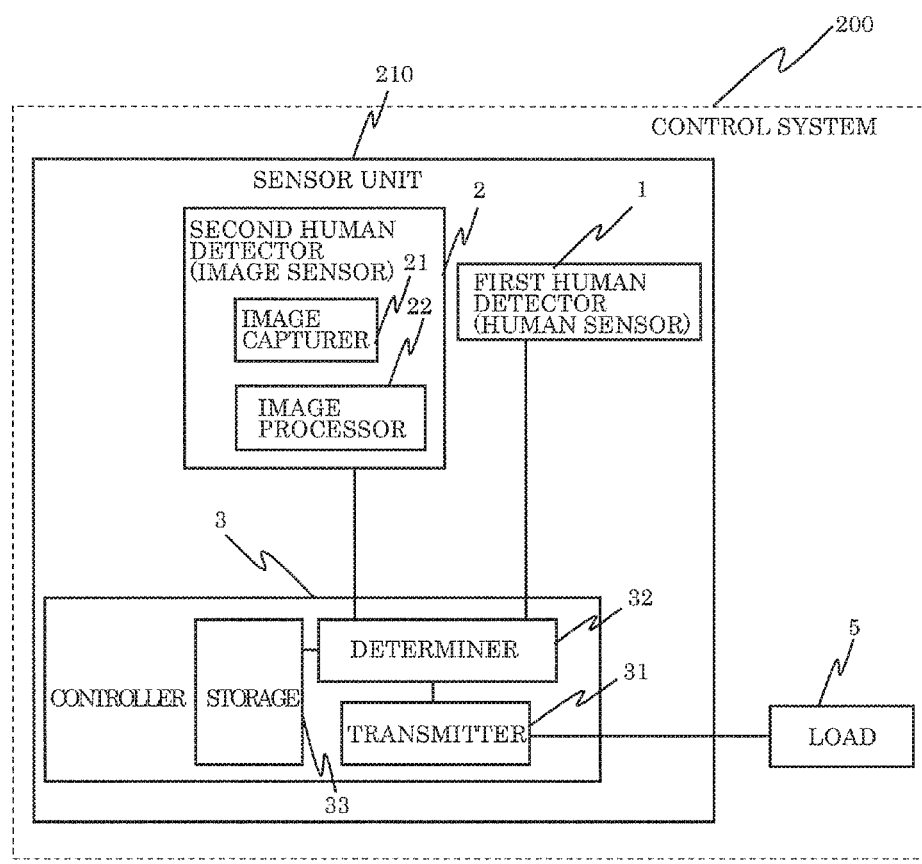
FIG. 4 is a block diagram of a control system according to Embodiment 2.

FIG. 4 is a block diagram of control system 200. Control system 200 shown in the diagram is different from that shown in FIG. 1 in that storage 33 is added. Hereinafter, differences will be mainly described. As shown in FIG. 4, controller 3 of sensor unit 210 in control system 200 includes storage 33 that stores therein predetermined period T (for example, 10 seconds) in advance.

Figure 5:
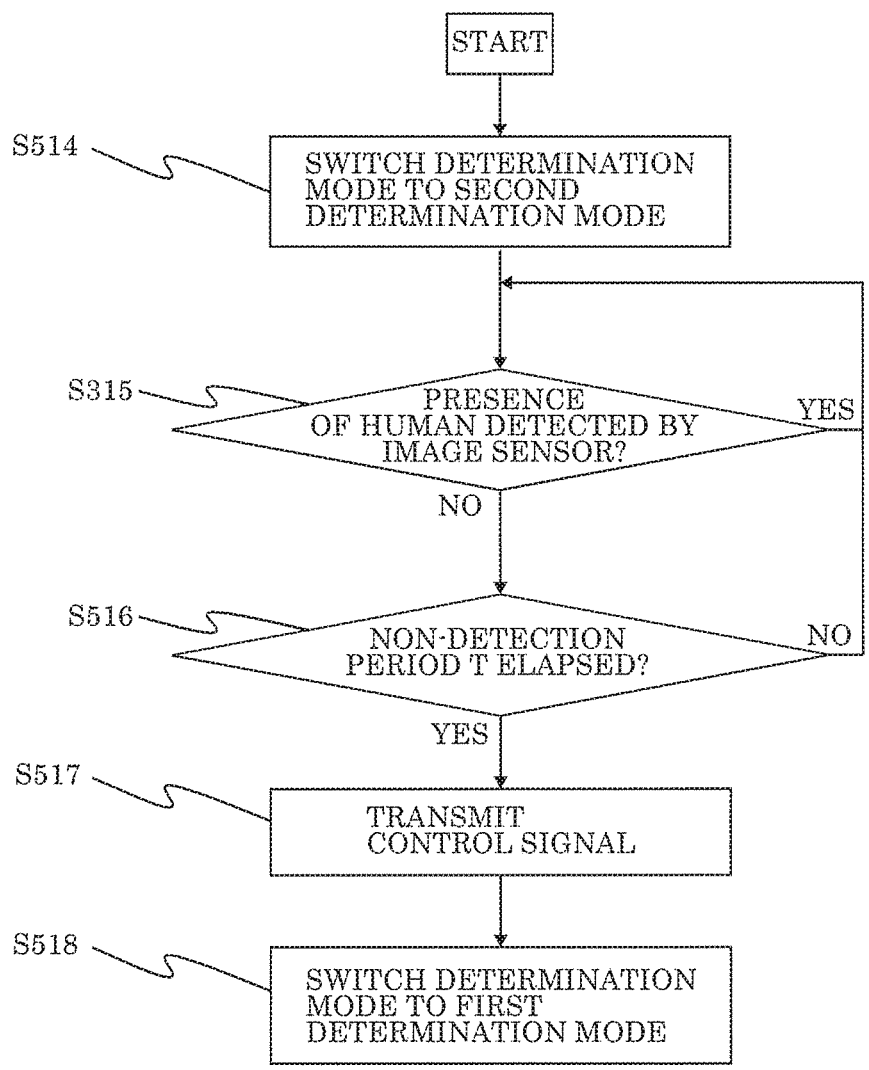
FIG. 5 is an operational flowchart performed by the control system according to Embodiment 2 after the determination mode has been switched to a second determination mode.

FIG. 5 is an operational flowchart performed by control system 200 after the determination mode has been switched to the second determination mode (step S514). In the present embodiment, the operations up to step S514 are the same as those of steps S311 to S314 of Embodiment 1.

In step S515, determiner 32 determines the presence or absence of a human based on the result of detection performed by image sensor 2 when determining the presence or absence of a human in the second determination mode. If image sensor 2 does not detect the presence of a human (NO in step S515), determiner 32 advances the procedure to step S516, and counts predetermined period T. If image sensor 2 detects the presence of a human, determiner 32 determines that there is a human within detection range 10, and continues to determine the presence or absence of a human in the second determination mode (YES in step S515).

In step S516, if image sensor 2 does not continuously detect the presence of a human over predetermined period T (time T elapses without the presence of a human being detected), determiner 32 determines that there is no human (YES in step S516), the procedure proceeds to step 517, and transmitter 31 transmits, to lighting apparatus 5, a control signal instructing lighting apparatus 5 to extinguish. If, on the other hand, image sensor 2 detects the presence of a human during predetermined period T, determiner 32 continues to determine the presence or absence of a human in the second determination mode (NO in step S516).

That is, transmitter 31 transmits, to lighting apparatus 5, a control signal instructing lighting apparatus 5 to extinguish when image sensor 2 continuously detects the absence of a human during the predetermined period, rather than transmitting the control signal to lighting apparatus 5 immediately after image sensor 2 detects the absence of a human. Accordingly, determiner 32 can reduce erroneous determination that there is no human.

In the present embodiment, predetermined period T may be set in advance, but the present invention is not limited thereto. For example, predetermined period T may be set arbitrarily. In this regard, an inputter for inputting predetermined period T may be additionally provided.

Also, it has been described in the present embodiment that determiner 32 starts to count predetermined period T when image sensor 2 does not detect the presence of a human, but the timing at which determiner 32 starts to count predetermined period T is not the gist of the present invention. For example, determiner 32 may start to count predetermined period T when the determination mode is switched.

Also, storage 33 is provided in controller 3, but the present invention is not limited thereto. For example, storage 33 may be provided outside controller 3.

Embodiment 3

Hereinafter, control system 300 and sensor unit 310 according to Embodiment 3 will be described with reference to FIG. 6. Control system 300 and sensor unit 310 are different from control system 200 and sensor unit 210 in that storage 33 further stores therein brightness threshold value Q1 (first threshold value) and that in the first determination mode, determiner 32 compares the brightness level of an image captured by image capturer 21 with first threshold value Q1 and switches the determination mode according to the result of comparison. The structural elements that are the same as those of Embodiment 2 are given the same reference numerals, and a description thereof is omitted as appropriate.

Storage 33 of controller 3 according to the present embodiment further stores therein brightness threshold value Q1.

When the surrounding environment of image sensor 2 is dark, an image captured by image capturer 21 is considered to have large noise. To be specific, when the surrounding environment of image sensor 2 is dark, in an analysis image, the number of pixels whose luminance change is greater than or equal to a predetermined value increases. For this reason, a human-absent area may be erroneously recognized as a human.

The brightness level of the analysis image when the number of pixels serving as noise is a predetermined value, for example, the number of pixels serving as noise accounts for 5% of the total number of pixels is set as brightness threshold value Q1.

In this case, if the brightness level of the image captured by image capturer 21 is less than first threshold value Q1, or to be specific, if the number of pixels serving as noise in the analysis image exceeds 5% of the total number of pixels, determiner 32 determines the presence or absence of a human based on the result of human detection performed by human sensor 1.

Figure 6:
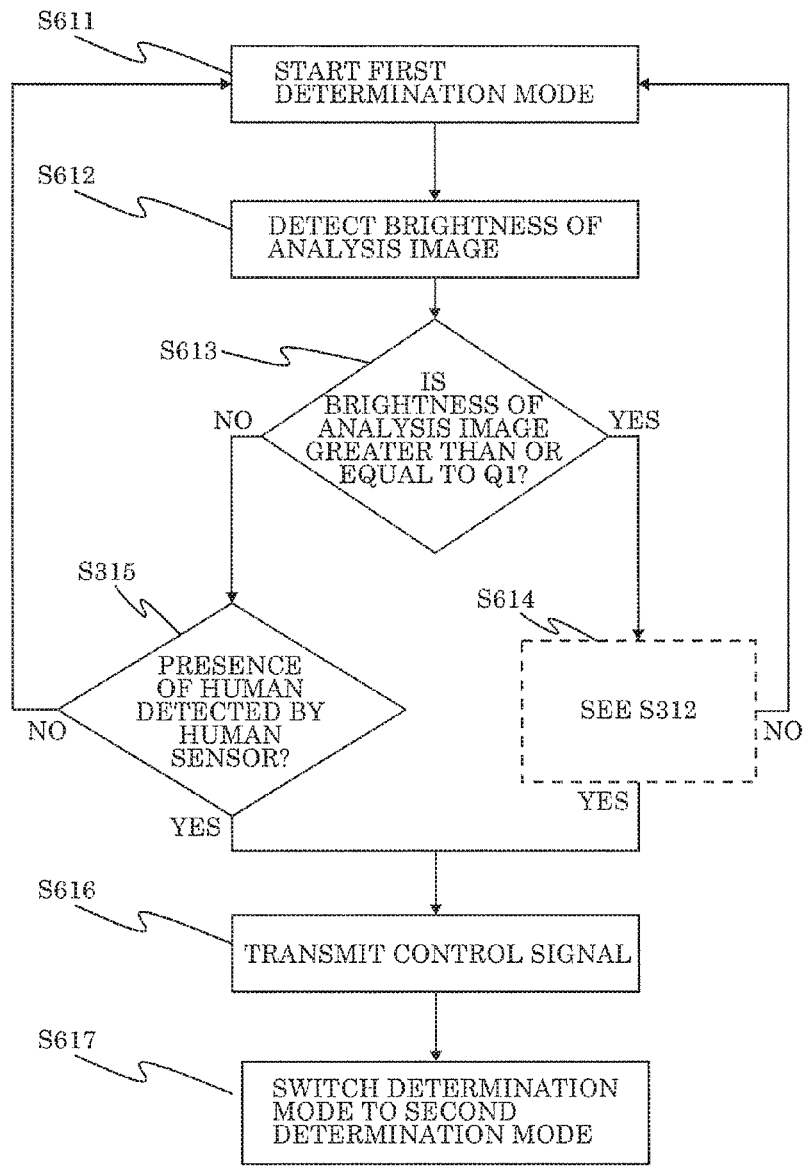
FIG. 6 is an operational flowchart performed in a first determination mode by a control system according to Embodiment 3.

FIG. 6 shows a flowchart from step S611 where control system 300 determines, in the first determination mode, the presence or absence of a human to step S617 where the determination mode is switched to the second determination mode. The operations in step S617 and the subsequent steps are the same as those of steps S314 to S317 according to Embodiment 1 or those of steps S514 to S518 according to Embodiment 2.

In determining the presence or absence of a human in the first determination mode (step S611), image processor 22 detects the brightness level of the image captured by image capturer 21 (step S612).

In step S613, determiner 32 compares the brightness level of the image captured by image capturer 21 with first threshold value Q1 stored in storage 33 (step S613). As a result of comparison, if the brightness level of the image captured by image capturer 21 is greater than or equal to first threshold value Q1 (YES in step S613), the procedure proceeds to step S614. Otherwise (NO in step S613), the procedure proceeds to step S615.

In step S614, the same processing as that of step S312 according to Embodiment 1 is performed. To be specific, if both human sensor 1 and image sensor 2 detect the presence of a human, determiner 32 determines that there is a human within detection range 10 (YES in step S614), and the procedure proceeds to step S616. If, on the other hand, at least one of human sensor 1 and image sensor 2 does not detect the presence of a human, determiner 32 determines that there is no human within detection range 10 (NO in step S614), and the procedure returns to step S611, where determiner 32 continues to determine the presence or absence of a human in the first determination mode.

In step S615, if human sensor 1 detects the presence of a human, determiner 32 determines that there is a human within detection range 10 (YES in step S615), and the procedure proceeds to step S616. If, on the other hand, human sensor 1 does not detect the presence of a human, determiner 32 determines that there is no human within detection range 10 (NO in step S615), and the procedure returns to step S611, where determiner 32 continues to determine the presence or absence of a human in the first determination mode.

In step S616, transmitter 31 transmits, to lighting apparatus 5, a control signal instructing lighting apparatus 5 to illuminate.

With control system 300, in the first determination mode, determiner 32 compares the brightness level of the image captured by image capturer 21 with first threshold value Q1, and the determination mode can be automatically switched according to the result of comparison. To be specific, if the brightness level of the image captured by image capturer 21 is greater than or equal to first threshold value Q1, determiner 32 determines the presence or absence of a human based on the results of detection performed by both human sensor 1 and image sensor 2. If, on the other hand, the brightness level of the image captured by image capturer 21 is less than first threshold value Q1, determiner 32 determines the presence or absence of a human based on the result of detection performed by human sensor 1. For this reason, control system 300 can automatically switch the determination mode to an optimal determination mode when the surrounding environment is dark, without having to use a sensor that detects the ambient brightness, which is provided in addition to sensor unit 310, and the accuracy of human detection can be improved.

In the present embodiment, as the method for setting first threshold value Q1, a method is used in which brightness threshold value Q1 is calculated and stored in storage 33 in advance, but the present invention is not limited thereto. For example, it is possible to use a method in which noise at maximum gain of the image captured by image capturer 21 is calculated, and first threshold value Q1 is set to a brightness level corresponding to two to three times an effective value of the magnitude of the noise at maximum gain of the image captured by image capturer 21.

In the case where first threshold value Q1 is set to a brightness level corresponding to two times the effective value of the magnitude of the noise at maximum gain of the image captured by image capturer 21, determiner 32 can ignore the result of detection performed by image sensor 2 if the number of pixels serving as noise in the image captured by image capturer 21 exceeds 5% of the total number of pixels. For example, in the case where the number of all pixels in the image captured by image capturer 21 is 400×400, determiner 32 does not employ the result of detection performed by image sensor 2 if the number of pixels serving as noise exceeds 8000.

In the case where first threshold value Q1 is set to a brightness level corresponding to three times the effective value of the magnitude of the noise at maximum gain of the image captured by image capturer 21, determiner 32 can ignore the result of detection performed by image sensor 2 if the number of pixels serving as noise in the image captured by image capturer 21 exceeds 0.3% of the number of all pixels. For example, in the case where the number of all pixels in the image captured by image capturer 21 is 400×400, determiner 32 does not employ the result of detection performed by image sensor 2 if the number of pixels serving as noise exceeds 480.

Embodiment 4

Hereinafter, control system 400 and sensor unit 410 according to Embodiment 4 will be described. Control system 400 and sensor unit 410 are different from control system 300 and sensor unit 310 in that storage 33 stores therein second threshold value Q2 for the image captured by image capturer 21, second threshold value Q2 being greater than first threshold value Q1 and that image sensor 2 detects the presence or absence of a human per pixel when the brightness level of the image captured by image capturer 21 is greater than or equal to second threshold value Q2. The structural elements that are the same as those of Embodiment 3 are given the same reference numerals, and a description thereof is omitted as appropriate.

According to Embodiments 1 to 3, the operation mode of lighting apparatus 5 is "illumination" mode when control systems 100, 200 and 300 determine the presence or absence of a human in the second determination mode, and thus detection range 2a of image sensor 2 is considered to be brighter than that when the operation mode of lighting apparatus 5 is "extinguishment" mode.

In this case, because the analysis image obtained in this state has less noise, image sensor 2 can perform human detection more finely such as, for example, per pixel, and the accuracy of the result of detection can be thereby enhanced.

For this reason, storage 33 of controller 3 of control system 400 stores therein second threshold value Q2 for the image captured by image capturer 21, second threshold value Q2 being greater than first threshold value Q1. Second threshold value Q2 may be set to a brightness level corresponding to four to six times the effective value of the magnitude of the noise at maximum gain of the image captured by image capturer 21.

Also, it is preferable that second threshold value Q2 is set to a value twice as large as first threshold value Q1. To be specific, if brightness threshold value Q1 is three times the effective value of the magnitude of the noise at maximum gain of the image captured by image capturer 21, second threshold value Q2 is set a value six times the same. At this time, the number of pixels serving as noise in the image captured by image capturer 21 is 0.0000002% of the total number of pixels. For example, in the case where the number of all pixels in the image captured by image capturer 21 is 400×400, if image sensor 2 performs human detection processing at 0.2 second intervals, the probability of the occurrence of pixels serving as noise will be about one pixel in ten minutes. For this reason, even when image sensor 2 performs human detection per pixel in the image captured by image capturer 21, it is considered that erroneous detection caused by noise is unlikely to occur.

Also, at the time when the presence or absence of a human is determined in the second determination mode, if the brightness level of the image captured by image capturer 21 is less than second threshold value Q2, it is possible to estimate that lighting apparatus 5 is not illuminated.

Accordingly, control system 400 includes an alarm generator that outputs an alarm upon receiving an anomalous signal. If, in the second determination mode, the brightness level of the image captured by image capturer 21 is less than second threshold value Q2, transmitter 31 outputs an anomalous signal to the alarm generator, and the alarm generator outputs an alarm. In this way, it is possible to inform the user of the occurrence of a problem in lighting apparatus 5.

In the second determination mode, control system 400 compares the brightness level of the image captured by image capturer 21 with second threshold value Q2 stored in storage 33. If the brightness level of the image captured by image capturer 21 is greater than or equal to second threshold value Q2, image processor 22 detects the presence or absence of a human per pixel in the image captured by image capturer 21. If the brightness level of the image captured by image capturer 21 is less than second threshold value Q2, control system 400 estimates that lighting apparatus 5 is not illuminated, and transmitter 31 outputs an anomalous signal to the alarm generator.

Through the above processing, control system 400 can perform human detection per pixel in the second determination mode if the brightness level of the image captured by image capturer 21 is greater than or equal to second threshold value Q2. For this reason, human detection can be performed with high accuracy.

On the other hand, in the second determination mode, if the brightness level of the image captured by image capturer 21 is less than second threshold value Q2, control system 400 can estimate that lighting apparatus 5 is not illuminated.

In this case, transmitter 31 outputs an anomalous signal to the alarm generator, and the alarm generator outputs an alarm to notify the user. In this way, it is possible to inform the user of the occurrence of a problem in lighting apparatus 5.

There is no particular limitation on the method for outputting an alarm, and it is possible to, for example, output a sound, present a display, or transmit an email to an email address registered in advance by the user.

Also, as the method for setting second threshold value Q2, a method can be used in which second threshold value Q2 is set in advance based on first threshold value Q1. Alternatively, a method can be used in which first threshold value Q1 is determined by actually measuring the surrounding environment by image sensor 2, and then second threshold value Q2 is set based on first threshold value Q1.

Also, since the first threshold value and the second threshold value are used in different determination modes, the first threshold value and the second threshold value may be set to any values. For example, second threshold value Q2 may be a value less than or equal to first threshold value Q1.

Embodiment 5

Hereinafter, control system 500 and sensor unit 510 according to Embodiment 5 will be described with reference to FIGS. 7 to 9. Control system 500 and sensor unit 510 are an example of processing of the analysis image when image sensor 2 detects the presence or absence of a human in control systems 100, 200, 300 and 400 and sensor units 110, 210, 310 and 410 according to Embodiments 1 to 4. The structural elements that are the same as those of Embodiment 1 are given the same reference numerals, and a description thereof is omitted as appropriate.

Figure 7:
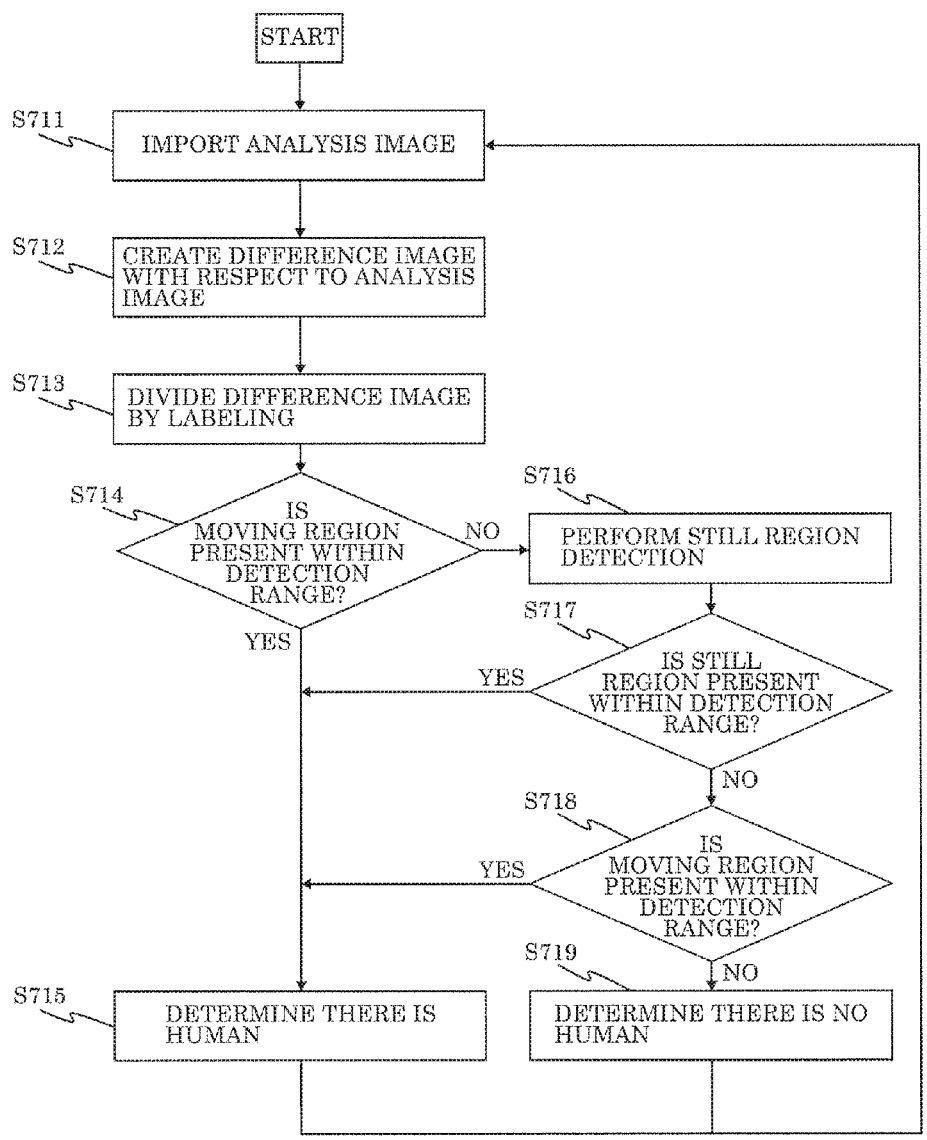
FIG. 7 is a flowchart for processing an analysis image performed by a control system according to Embodiment 5.

FIG. 7 is a flowchart for processing an image captured by image capturer 21, which is performed by control system 500. As shown in FIG. 7, image processor 22 imports an image captured by image capturer 21 (step S711), and removes an object and the like that are not recognized as a human such as the background from the image captured by image capturer 21 so as to create a difference image (step S712).

In step S713, image processor 22 divides the difference image by labeling, and the procedure proceeds to step S714.

Figure 9:
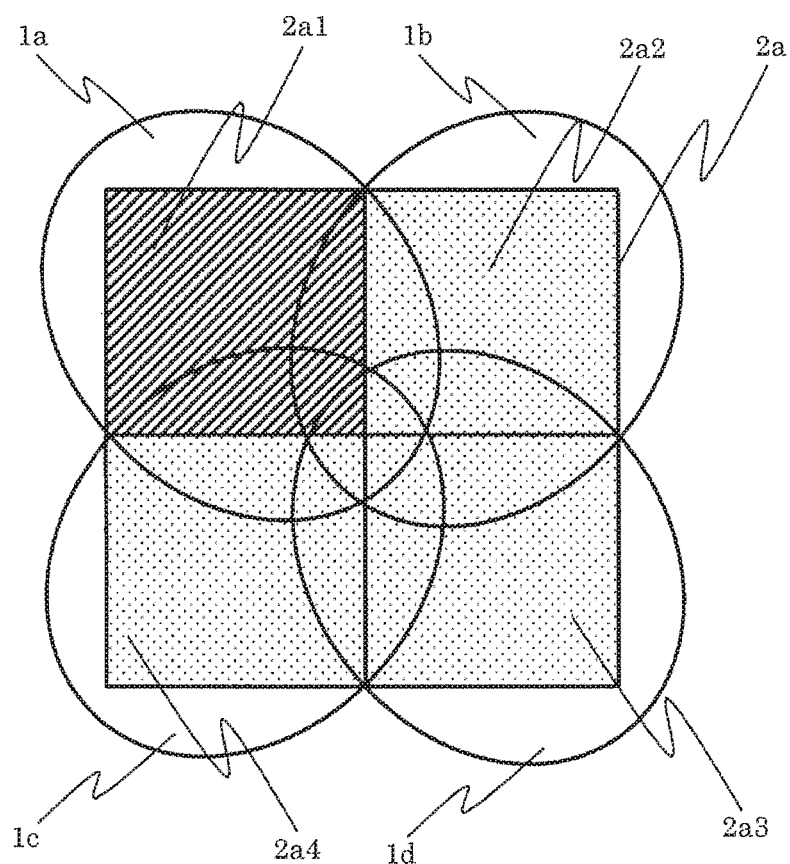
FIG. 9 is a plan view showing an example of labeling of detection ranges in an analysis image according to Embodiment 5.

As the method for dividing the difference image, for example, as shown in FIG. 9, detection range 2*a* of image sensor 2 is divided into detection ranges 2*a*1, 2*a*2, 2*a*3 and 2*a*4 according to detection ranges 1*a*, 1*b*, 1*c* and 1*d* of human sensor 1 such that detection ranges 2*a*1, 2*a*2, 2*a*3 and 2*a*4 overlap with detection ranges 1*a*, 1*b*, 1*c* and 1*d*.

In step S714, image processor 22 determines whether or not a moving region that is regarded as a human is present within detection range 10. If it is determined that there is a moving region within detection range 10, image processor 22 determines that there is a human within detection range 10 (step S715). The moving region can be obtained by comparing, for example, a difference image at time t1 and a difference image at time t2.

If it is determined, in step S714, that there is no moving region within detection range 10 (NO in step S714), image processor 22 performs still region detection (step S716). The still region detection will be described later.

If it is determined in step S717 that there is a still region within detection range 10 (YES in step S717), image processor 22 determines that there is a human within detection range 10 (step 715). If, on the other hand, it is determined that there is no still region within detection range 10 (NO in step S717), image processor 22 again determines whether or not there is a moving region within detection range 10 (step S718).

In step S718, if it is determined that there is a moving region within detection range 10 (YES in step 718), image processor 22 determines that there is a human within detection range 10 (step 715). If, on the other hand, it is determined that there is no moving region within detection range 10 (NO in step 718), image processor 22 determines that there is no human within detection range 10 (NO in step 718).

Figure 8:
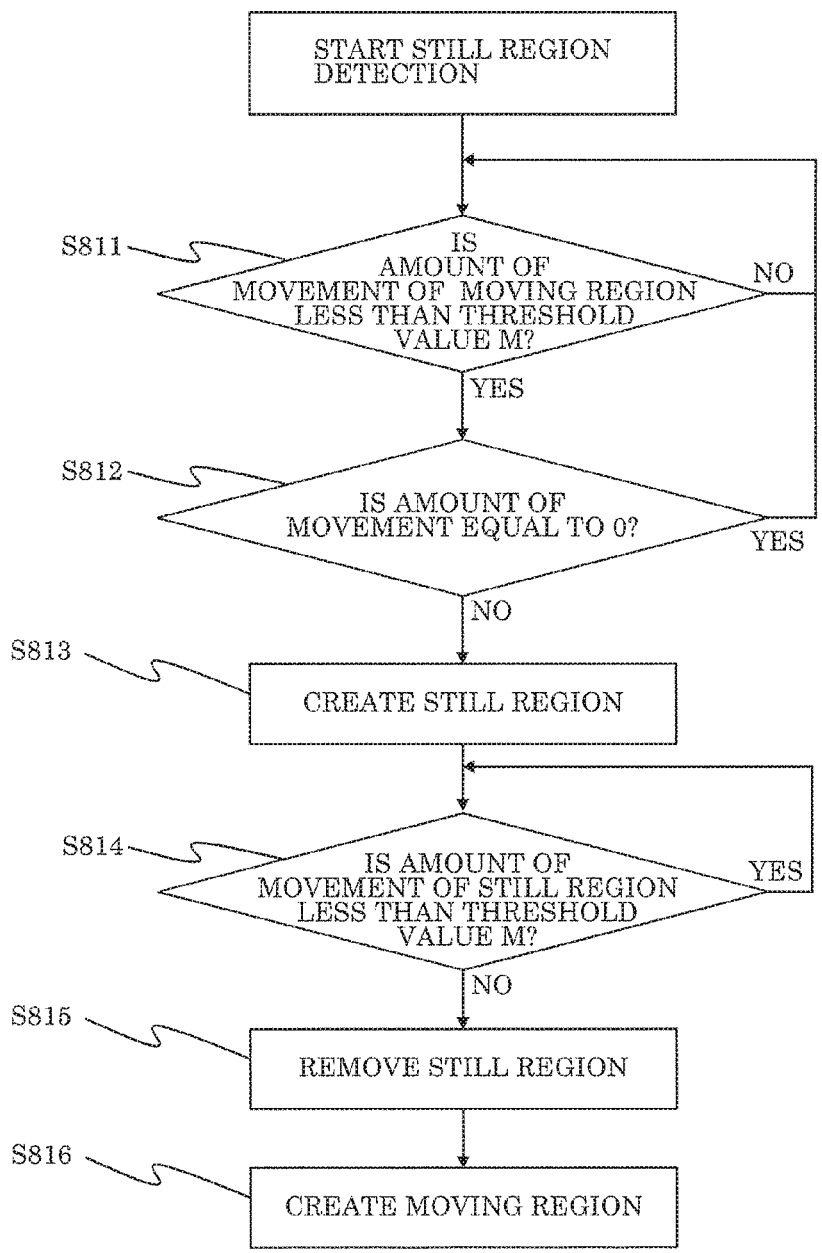
FIG. 8 is a flowchart of still region detection performed by the control system according to Embodiment 5.

FIG. 8 is a flowchart of still region detection performed by control system 500.

First, image processor 22 calculates the amount of movement of the moving region and compares the amount of movement of the moving region with moving amount threshold value M stored in storage 33 (step S811).

If the amount of movement of the moving region is greater than or equal to moving amount threshold value M, image processor 22 determines that the amount of movement of the moving region is large (NO in step S811), and returns to the still region detection.

If the amount of movement of the moving region is less than moving amount threshold value M, image processor 22 determines that the amount of movement of the moving region is small (YES in step S811), and determines whether or not the amount of movement of the moving region is 0 (step S812). If it is determined that the amount of movement of the moving region is 0 (YES in step S812), there is a possibility that image processor 22 may have made an erroneous determination, and thus image processor 22 returns to the still region detection. If, on the other hand, it is determined that the amount of movement of the moving region is not 0 (NO in step S812), image processor 22 creates a still region (step S813).

After creating a still image, image processor 22 monitors the still region, then calculates the amount of movement of the still region in the same manner as in step S811 and compares the amount of movement of the still region with moving amount threshold value M (step S814).

If the amount of movement of the still region is less than moving amount threshold value M (YES in step S814), image processor 22 continues to monitor the still region. If, on the other hand, the amount of movement of the still region is greater than or equal to moving amount threshold value M (NO in step S811), image processor 22 determines that the amount of human movement is large, and removes the still region (step S815), thereby creating a moving region (step S816).

In the present embodiment, the detection range of image sensor 2 is divided according to detection ranges 1*a*, 1*b*, 1*c* and 1*d* of human sensor 1, and thus image sensor 2 can detect only the detection ranges, in which there is a human, obtained by dividing the detection range of image sensor 2, rather than detecting the entirety of detection range 2*a*. Accordingly, the efficiency of image sensor 2 can be enhanced.

Also, by creating the moving region and the still region according to the magnitude of the amount of human movement, human sensor 1 and image sensor 2 can set an appropriate accuracy according to the magnitude of the amount of human movement and detect the presence or absence of a human with even higher accuracy.

In the present embodiment, for the sake of convenience of the description, the configuration in which the detection range of image sensor 2 is divided according to detection ranges 1*a*, 1*b*, 1*c* and 1*d* of human sensor 1 and the configuration in which the moving region and the still region are created according to the magnitude of the amount of human movement have been described, but either one of the configurations may be included.

As described above, the embodiments have been described as examples of the technique according to the present invention. To this end, the accompanying drawings and the detailed description have been given.

Accordingly, the structural elements illustrated in the accompanying drawings and described in the detailed description may include not only structural elements that are required to solve the problem but also structural elements that are merely given to illustrate the technique according to the present invention and thus are not required to solve the problem. For this reason, the structural elements that are not required to solve the problem should not be construed as requirements of the present invention just because of the fact that they are illustrated in the accompanying drawings and described in the detailed description.

Also, the embodiments given above are merely provided to illustrate the technique according to the present invention, and thus various modifications, replacements, additions, omissions and the like can be made within the scope of the claims or the range of equivalency.

The invention claimed is:

1. A control system comprising:
a first human detector that detects presence or absence of a human within a first detection range without causing a reduction in sensitivity even in a dark environment;
a second human detector that has a second detection range that overlaps with the first detection range, the second human detector including an image capturer that captures an image in the second detection range and detecting presence or absence of a human within the second detection range based on the image captured by the image capturer;
a determiner that has a plurality of determination modes for determining presence or absence of a human;
a transmitter that transmits a control signal to a control target based on a result of determination made by the determiner; and
a load that receives the control signal and serves as the control target whose operation mode is switched according to the control signal,
wherein when the load is in a first operation mode, the determiner performs operation in a first determination mode for determining presence or absence of a human based on at least a result of detection performed by the first human detector, and
when the load is in a second operation mode that is different from the first operation mode, the determiner performs operation in a second determination mode for determining the presence or absence of a human based on a result of detection performed by the second human detector, and
wherein in the first determination mode,
the determiner detects a brightness level of the image captured by the image capturer of the second human detector,
when the brightness level is less than a first threshold value, the determiner determines the presence or absence of a human based on the result of detection performed by the first human detector, and
when the brightness level is greater than or equal to the first threshold value, the determiner determines the presence or absence of a human based on results of detection performed by the first human detector and the second human detector.

2. The control system according to claim 1,
wherein when the determiner determines, in the first determination mode, that there is a human, the transmitter transmits a control signal instructing the load to switch the operation mode to the second operation mode, and
when the determiner determines, in the second determination mode, that there is no human, the transmitter transmits a control signal instructing the load to switch the operation mode to the first operation mode.

3. The control system according to claim 1,
wherein in the second determination mode, the determiner determines that there is no human when the second human detector does not continuously detect a human over a predetermined period, and
the transmitter transmits the control signal instructing the load to switch the operation mode to the first operation mode when the determiner determines, in the second determination mode, that there is no human.

4. The control system according to claim 1,
wherein the load is a lighting apparatus,
the first operation mode is a mode in which the lighting apparatus is extinguished, and
the second operation mode is a mode in which the lighting apparatus is illuminated.

5. The control system according to claim 1, wherein the first threshold value is set to a brightness level corresponding to two to three times an effective value of magnitude of noise at maximum gain of the captured image.

6. The control system according to claim 1,
wherein in the second determination mode,
when the captured image has a brightness level greater than or equal to a second threshold value, the second human detector performs processing of determining the presence or absence of a human based on a luminance change per pixel of the image.

7. The control system according to claim 6,
wherein the transmitter includes an outputter that outputs an anomalous signal, and
the outputter outputs the anomalous signal when the brightness level of the image captured by the image capturer of the second human detector is less than the second threshold value.

8. The control system according to claim 6, wherein the second threshold value is set to a brightness level corresponding to four to six times an effective value of magnitude of noise at maximum gain of the captured image.

9. The control system according to claim 1,
wherein the first human detector includes a plurality of sensors,
the second detection range is included in the first detection range, and
the first detection range is divided into a plurality of detection ranges according to the number of the plurality of sensors, and the plurality of detection ranges obtained by dividing the first detection range correspond to the plurality of sensors.

10. A sensor unit comprising:
a first human detector that detects presence or absence of a human within a first detection range without causing a reduction in sensitivity even in a dark environment;
a second human detector that has a second detection range that overlaps with the first detection range, the second human detector including an image capturer that captures an image in the second detection range and detecting presence or absence of a human within the second detection range based on the image captured by the image capturer;

a determiner that has a plurality of determination modes for determining presence or absence of a human; and a transmitter that transmits, to a load, a control signal instructing the load to switch an operation mode of the load based on a result of determination made by the determiner, wherein when the load is in a first operation mode, the determiner performs operation in a first determination mode for determining the presence or absence of a human based on at least a result of detection performed by the first human detector, and when the load is in a second operation mode that is different from the first operation mode, the determiner performs operation in a second determination mode for determining the presence or absence of a human based on a result of detection performed by the second human detector, and wherein in the first determination mode, the determiner detects a brightness level of the image captured by the image capturer of the second human detector, when the brightness level is less than a first threshold value, the determiner determines the presence or absence of a human based on the result of detection performed by the first human detector, and when the brightness level is greater than or equal to the first threshold value, the determiner determines the presence or absence of a human based on results of detection performed by the first human detector and the second human detector.

* * * * *